May 24, 1932.  G. G. RHINEVAULT  1,859,633
MACHINE FOR MAKING PARQUETRY BLOCKS
Filed Dec. 10, 1930  5 Sheets-Sheet 1

INVENTOR
GLENN G. RHINEVAULT
BY
ATTORNEY

Patented May 24, 1932

1,859,633

UNITED STATES PATENT OFFICE

GLENN G. RHINEVAULT, OF SAGINAW, MICHIGAN, ASSIGNOR TO W. B. MERSHON CO., OF SAGINAW, MICHIGAN

MACHINE FOR MAKING PARQUETRY BLOCKS

Application filed December 10, 1930. Serial No. 501,335.

This invention relates to a machine for making parquetry blocks by securing together short pieces of wooden or equivalent flooring, preferably tongued and grooved and delivering them as completed parquetry units. The flooring pieces are deposited in the machine edge to edge in block form, approximately the size and shape desired, and the machine automatically manufactures splines from ribbon metal and affixes them to the blocks, thus permanently securing together the constituent flooring pieces.

A spline joint made by this machine is characterized by a mortise or groove cut into the wood across the back surface of the blocks and crosswise the grain of its flooring pieces, there being permanently locked in the groove the above mentioned spline, made from a strip of thin ribbon metal that has been creased lengthwise to present a cross section substantially V-shaped. This spline piece, placed in the groove with its edges adjacent the corners of the groove is severed from the ribbon strip and flattened by pressure applied in such a way as to embed the longitudinal edges of the spline in the wood along the walls of the groove. The spline thus becomes a permanent fastening element that alines, binds together and reinforces the several pieces of the completed parquetry unit.

The object of my invention is to provide an automatic machine that takes in a ribbon metal strip and also takes in pieces of flooring positioned edge to edge in the general form of a block, and after performing appropriately timed operations on the block and the ribbon metal delivers parquetry units that are ready to be edge trimmed and faced.

A machine embodying my invention has the general form of a work table along which the blocks of flooring pieces travel step-by-step from a supply hopper that is preferably located beside and at one end of the table, to a spline-affixing and block-ejecting station about midway the length of the table, while coincidently the ribbon metal for the splines is fed step-by-step from a reel, preferably located at the end of the table remote from the hopper and is forwarded to the said station, being formed into V-shape on the way.

At the assembling station where the blocks and splines meet are suitable spline-inserting, severing and flattening mechanisms and suitable releasing devices and block-ejecting mechanisms.

The primary object of the invention, as above stated, is attained by the co-operation of a number of subordinate combinations of mechanisms herein described and claimed. Among the objects attained by such mechanisms are the following:

To provide improved block guiding and alining devices that preserve the alinement of the pieces of flooring prior to and during the cutting of the spline grooves; other alining guides prior to and during the affixing of the splines in the blocks; an improved spline making mechanism and spline affixing mechanism; an improved block-ejecting mechanism; a power actuated driving mechanism. All of the above groups co-operate in performing the block-and-spline operations successively and in appropriately timed-in relation to each other so as to produce with great speed parquetry units that are strongly constructed and accurately assembled.

With the foregoing and certain other objects in view, which will appear later in the specification, my invention comprises the devices described and claimed and the equivalents thereof.

The devices for putting the blocks together ready to receive the splines, for making the splines and for assembling the blocks and splines and for ejecting the finished parquetry units will now be described, after which the means by which the mechanisms are driven will be set forth in sufficient detail to enable those skilled in the art to make and use the same.

Figures 1, 4, 4A, 5:
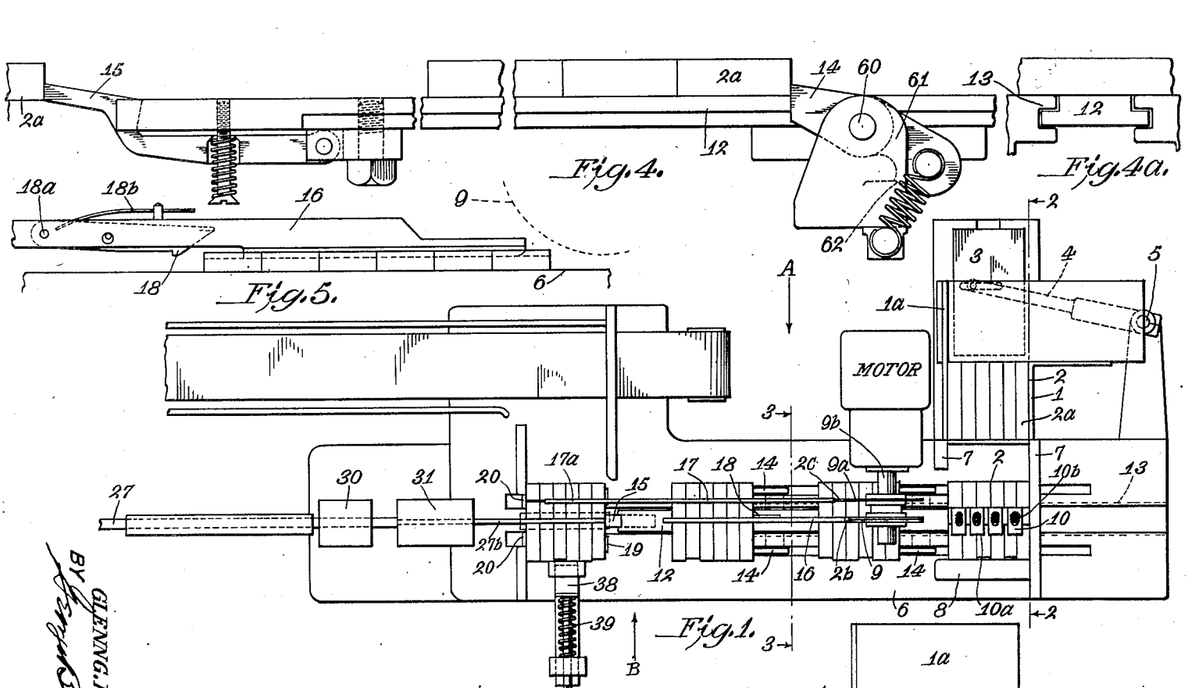
Fig. 1 is a diagrammatic plan view of the work table showing the various stages of progress of the blocks and splines through the machine.
Fig. 4 is a fragmentary side view of the block-forwarding reciprocatory rail and its disappearing spring pressed fingers.
Fig. 4a is an end view of the rail and its supporting ways.
Fig. 5 is a side view of a portion of the pilot bar and its spring pressed latch.
Figure 2:
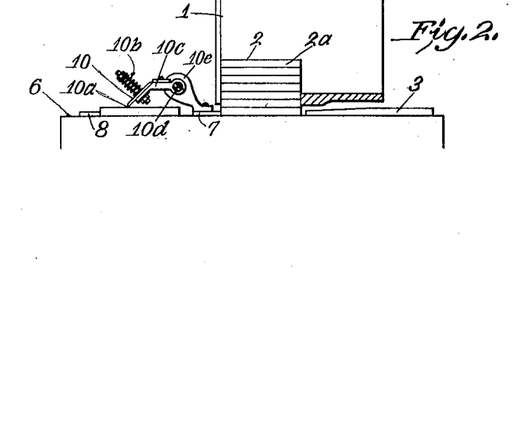
Fig. 2 is a vertical section on line 2—2 of Fig. 1.

Referring to Fig. 1, a supply hopper 1 contains a supply of blocks 2 each assembled in a preliminary way from short pieces of flooring 2a, laid edge to edge, the blocks being stacked as shown in Fig. 2. The walls 1a of the hopper are preferably adjustable toward and away from each other in known manner, according to the size of the block desired.

Figure 3:
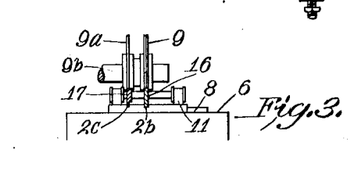
Fig. 3 is a vertical section taken on line 3—3 of Fig. 1, showing the groove cutters and the associated hold-down bars.

A pusher bar 3 reciprocated by an arm 4 and a power driven rock shaft 5 propels the successive bottom blocks out of the hopper toward the bed or table 6 in regular order. The individual pieces of flooring that make up each block are kept in alinement and prevented from clogging while they are being propelled from the hopper to the work table, by means of guide rails 7, 7. An end stop 8 prevents over-travel of any loose piece. Upon leaving the guide rails 7, 7 the blocks are guided at right angles to their former path along the table 6 toward the groove cutters 9, 9a by spring-pressed holding down fingers 10 of novel construction, equipped on their working faces with transverse ribs 10a that are directioned lengthwise of the table, the ribs being sufficiently sharp at their edges to slightly score the surface of each flooring piece of each block when it commences to travel along the table, thereby directing it straight into the cutters 9, 9a and under their hold-down bars 11 of known construction, shown in Figs. 3, 6 and 8.

The block is forwarded step-by-step along the table by means of a longitudinally reciprocatable rail 12, shown in Figs. 1, 4, 4a and 7, that slides back and forth in ways 13, 13 with minimum feeding speed at the end of the working or forward stroke and quick return movement on the back stroke.

Figures 7, 8:
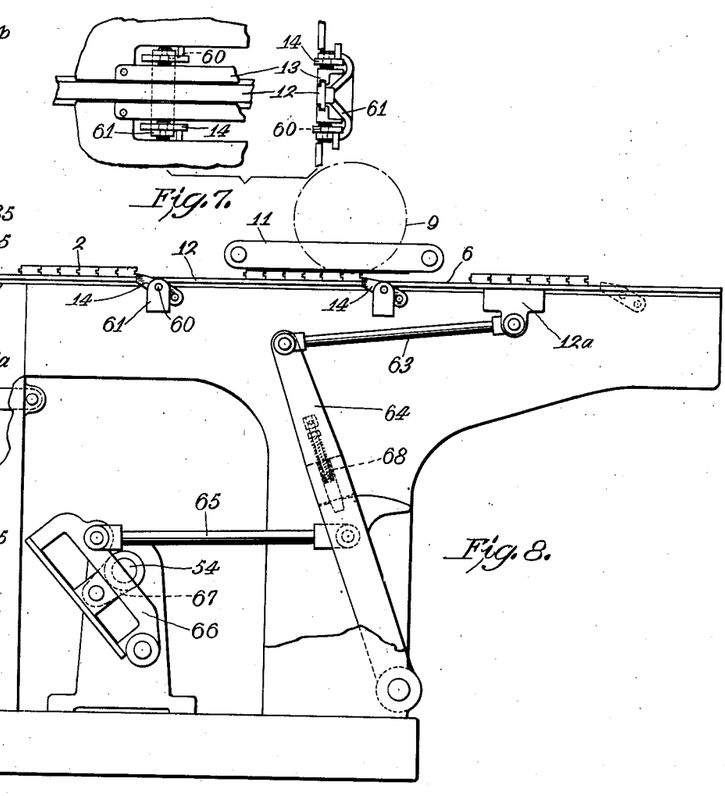
Fig. 7 is a plan view and end view showing the arrangement of the reciprocable rail, and its disappearing fingers.
Fig. 8 is a side view of the table and assembly station of the machine, partly broken away and with the guide rails removed as seen in the direction of the arrow, B, Fig. 1.
Figure 9:
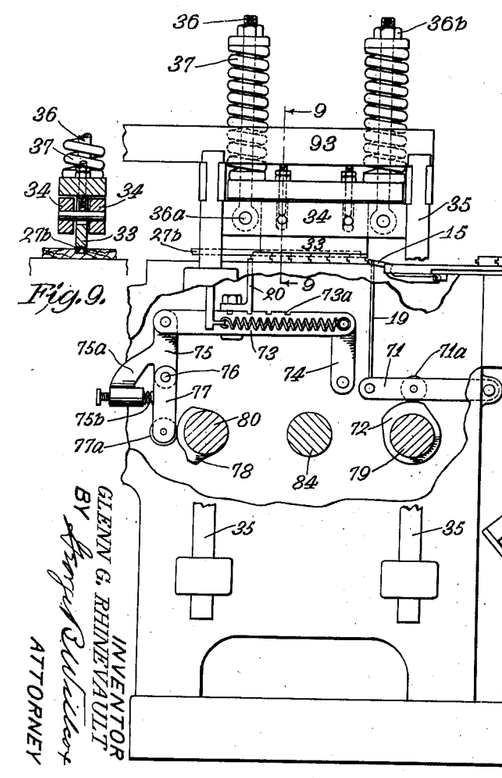
Fig. 9 is a sectional detail on line 9—9 of Fig. 8.

The rail carries spring-actuated disappearing fingers 14, 15 that are pivotally mounted so as to normally project above the table. For that purpose the disappearing fingers 14, 15 are spaced apart along the rail a distance less than the length of travel of the rail, so each finger travels backward far enough to get behind the block that was left on the table by the preceding finger when it reached the end of its previous forward travel. Thus, while the rail moves back and forth the blocks are forwarded intermittently in regular order, with periods of rest between.

The motor driven saw-toothed groove cutters 9, 9a are operatively positioned above the table so as to cut one or more spline grooves 2b and an alinement groove 2c in the face of each block as the block passes between the table and the cutters.

Proceeding, the block encounters alining and guiding devices, shown in Figs. 1, 3, 6 and 6a, that include a stationary pilot bar 16, which commences close to the cutters and is located above the table so as to be received in the newly formed spline groove 2b. When the block leaves the groove cutter, bar 16 acts to insure the accurate entrance of a second guide bar, called the alinement guide bar, 17, into the alinement groove 2c. That part of the alinement bar 17 which is first engaged by the block is stationary, whereas the part 17a, which is at the spline affixing or assembly station, is liftable. The liftable part, 17a, when up, frees the block previous to its ejection from the machine.

It will now be understood that the block, as it leaves the groove cutters is guided toward the assembly station by the pilot bar 16 and is thereafter guided up to the assembly station by the stationary part 17 of the alinement bar and into the station by the liftable part 17a, thus leaving the spline groove 2b free to receive the spline. Liftable bar 17a keeps the block in alinement while the spline is being inserted and fastened in its groove. As shown in Figs. 1 and 5, pilot bar 16 also carries a spring-pressed latch 18 pivoted at 18a and normally pressed down by spring 18b whose end is fixed to bar 16, to prevent the block from being dragged backward on the table during the return stroke of the reciprocatory rail.

Referring now to Figs. 1 and 8, a joint compressing mechanism is located preferably at the station where the splines are affixed to the blocks. It squeezes into close engagement the interlocked edge joints of the pieces of flooring that comprise each block and by so doing exerts a predetermined amount of yielding clamping force against the opposite edge of the block. The squeezing mechanism includes a disappearing abutment stop 19 arranged and timed to disappear while the block is passing along the table and to rise up behind the block when it arrives at the assembly station, and a co-operating spring-controlled pusher 20 is positioned ahead of the block. Pusher 20 is mechanically actuated to squeeze the block against the disappearing stop 19 when the latter is upwardly projected to its working position.

The part of the machine that makes the splines and inserts them in the blocks will now be described, reference being had to Figs. 6, 10, 11 and 12. The functions of the spline making mechanism are to partly sever an advancing strip of ribbon metal at places spaced apart lengthwise the ribbon by a distance appropriate to the width of the blocks; to crease the spline lengthwise into trough-like form, then to insert the V-shaped spline into the groove of a block; finally to flatten the spline in the groove and thereby completely sever it from the ribbon.

Figures 11, 12, 13, 14, 15, 22:
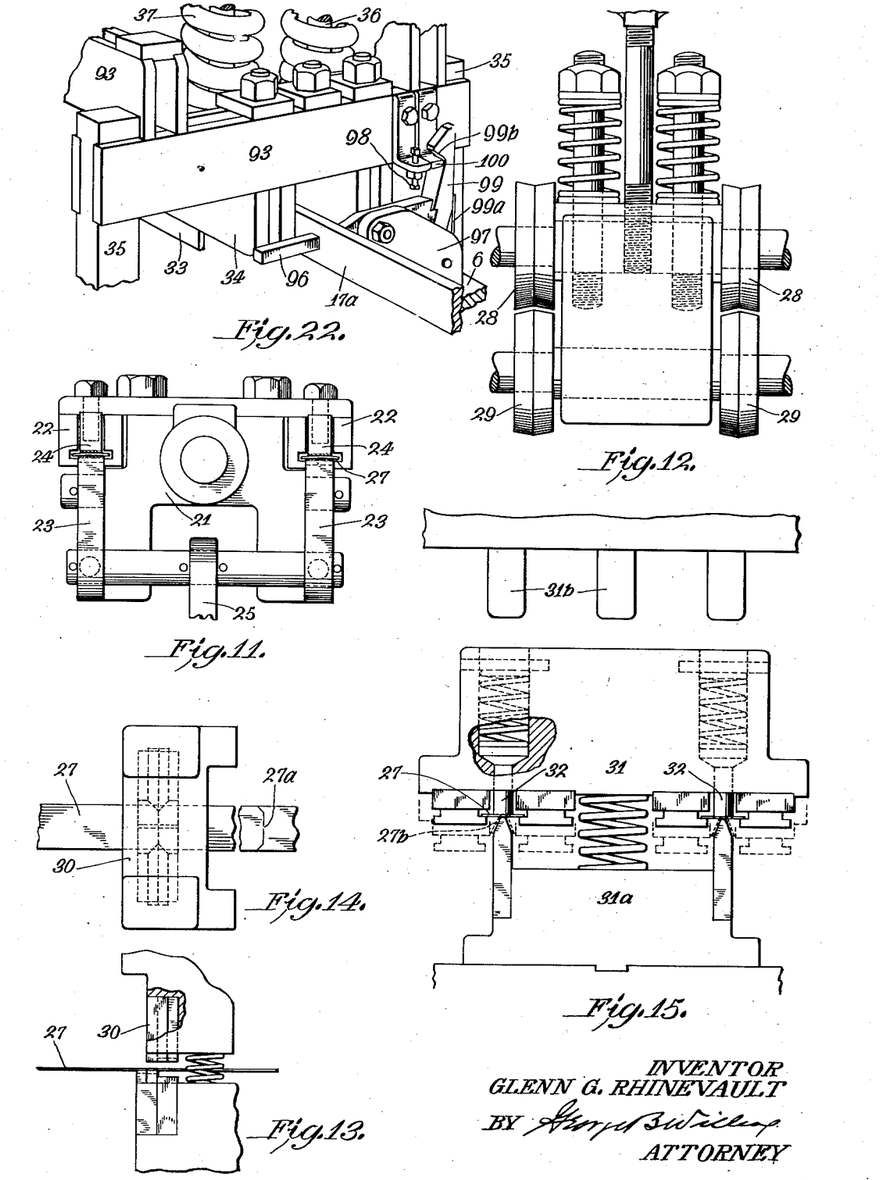
Fig. 11 is an end view of a cross-head adapted to feed two ribbon metal strips simultaneously.
Fig. 12 is a front view of two pairs of ribbon strip crimping rolls.
Fig. 13 is a side view, partly in section, of the ribbon shearing die.
Fig. 14 is a plan view of the same.
Fig. 15 is an end elevation, partly in section, of a spline forming die.
Fig. 22 is a perspective view, broken away in part, showing the device for actuating the liftable block guiding bar.

The spline fabricating mechanism, in the preferred form which I employ for purposes of description, includes a cross-head 21 slidably mounted on horizontal ways 22 and carrying a pivoted finger 23 and an opposed anvil member 24. The lower end of the pivoted finger is connected to an actuating bar 25 that imparts back and forth sliding movement to the cross-head 21 and is actuated by a power driven rock shaft 26. The finger 23 and anvil 24 are arranged so that on the feeding-in stroke of the cross-head the ribbon metal 27 is gripped and enough of its to make a spline is drawn from the reel into the machine. Positioned between the reel and the cross-head 21 is a pair of ribbon crimping rolls 28, 29, shown in detail in Fig. 12, fashioned to form the ribbon to a somewhat concavo-convex cross section, as indicated in Fig. 11, and thereby strengthen the ribbon and facilitate guiding it into the machine. The upper roll 28 is preferably spring pressed.

At the conclusion of each forward movement of the cross-head a desired length of ribbon material is fed to a shearing die 30, shown in detail in Figs. 13 and 14, the shears being of such shape that they sever the ribbon 27 crosswise except for a small connecting tab 27a.

The next forward movement of the ribbon metal strip feeds the partly severed spline between a pair of spline forming dies 31, 31a shown in Fig. 15. The pairs of dies are here shown in duplicate for forming two splines simultaneously, it being understood that only one die may be used at a time if desired. The down position of the dies and the V-shape of the folded spline are indicated by dotted lines. Die 31 is provided with a spring-pressed stripping pin 32, operating in known manner.

After leaving the V-forming die the spline 27b in its next intermittent forward movement enters the spline groove 2b of the block which simultaneously arrives at the spline affixing mechanism, in the manner previously described.

The spline 27b slides endwise into the groove 2b of the advancing block and when it stops is found to be positioned beneath a flattening plunger 33, shown in Figs. 8, 9, 10 and 16. Plunger 33 is mounted in a vertically movable frame consisting of two plates 34, 34 that are actuated up and down by power-driven reciprocating rods 35. The plunger proper, 33, is slidingly sandwiched between the plates 34, 34. Two vertical bolts 36 are fixed to the plates 34 by transverse pins 36a and extend up through the upper part of the plunger 33. The bolts 36 are provided with compression springs 37 and have nuts 36b at their upper ends for adjusting the springs. The lower ends of the springs rest on the top of the plunger 33. The purpose of the compression springs 37 is to control the pressure exerted by the plunger upon the spline during the flattening operation. The springs are stiff enough to flatten the spline but they will yield in case of obstruction before any of the mechanism breaks.

Figures 10, 16, 17, 18, 19, 20, 21:
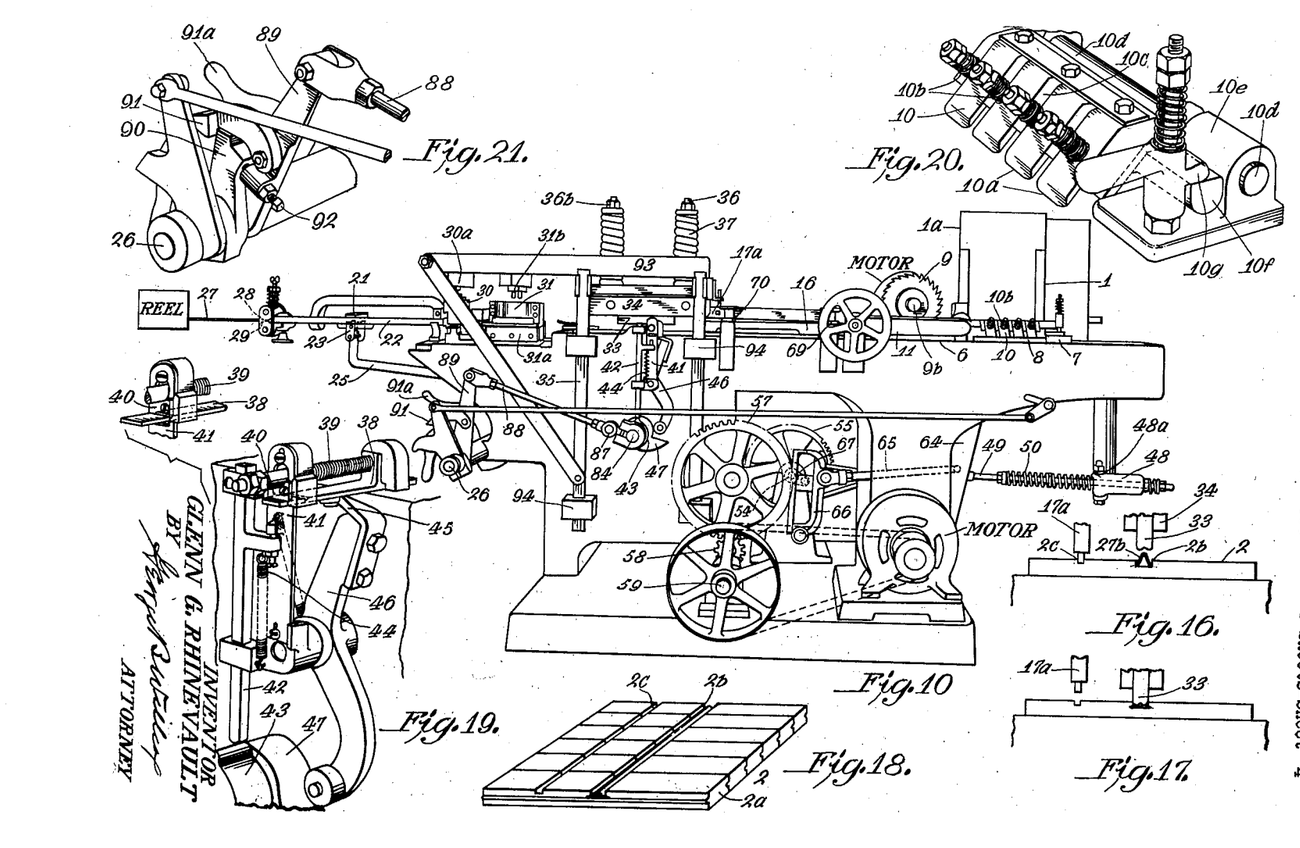
Fig. 10 is a front view of the complete machine.
Fig. 16 is a diagrammatic end view of the spline flattening die raised and the liftable guide bar shown in the alining groove of a block.
Fig. 17 is a similar view showing the plunger down and the guide bar lifted.
Fig. 18 is a perspective view of a completed parquetry piece.
Fig. 19 is a perspective view of the block-ejecting mechanism.
Fig. 20 is a perspective view of the holding down and guiding fingers for the blocks as they leave the supply hopper.
Fig. 21 is a perspective view of the device that releasably connects the spline making mechanism to the block making mechanism.

Complete severing of the spline occurs when the spline is flattened. The small connecting tab 27a at the apex of the spline breaks because the adjacent spline piece is supported by the block and retains its V-shape while the spline piece that is beneath the plunger goes down.

The spline, having been inserted into the block and locked in place in the manner described, securely holds the flooring pieces together, as shown in Figs. 17 and 18.

After the flattening die and liftable guide bar 17a rise the block is ready to be ejected from the machine, as will now be described, reference being had to Figs. 1, 10 and 19.

An ejecting plate 38 is slidable on the table and is shot forward by the action of the spring 39 when the plate is released from a trigger-like device that holds it normally retracted and ready for action.

The trigger 40 is mounted on a vertically movable plate 41 that can be raised and lowered by a vertically slidable cam-actuated bar 42. The bar is normally kept in contact with the cam 43 by a tension spring 44. The cam is fixed to a central shaft 84, to be described later. At each revolution of the cam 43 the bar lifts and the trigger 40 releases the ejecting plate to permit it to propel the block out of the machine. At each cycle of operations the ejecting plate is drawn back and reset on the trigger. The means for drawing it back consists of a cam-shaped wiper 45 on the end of an arm 46 oscillatable by means of a second cam 47 on the central shaft, working in timed-in relation with the releasing cam 43.

Having described the general operation of the block and spline handling parts of the machine, reference will now be made to the various mechanisms by which those parts are actuated.

Figures 6, 6A:
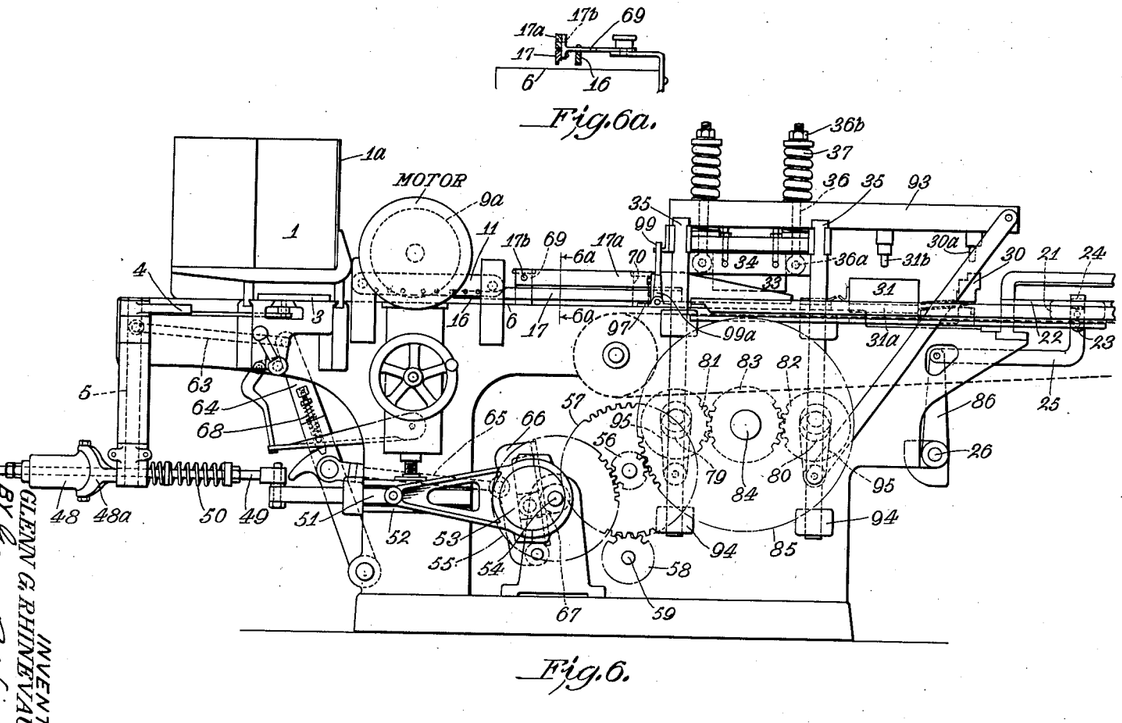
Fig. 6 is a side view of the machine seen in the direction of the arrow, A, Fig. 1.
Fig. 6a is a vertical section through the guide bars on line 6a—6a of Fig. 6.

Referring now to Figs. 1, 6 and 10, the pusher 3 of the supply hopper 1 is driven by the arm 4 and the upright rock shaft 5. At the bottom of the rock shaft, which is mounted on the frame of the machine, is a horizontal housing 48, to the end of which is swiveled a crank arm 48a fixed to the rock shaft 5. A connecting rod 49, slidingly received in the housing, has a cushioning spring 50 normally bearing against the housing 48. The rod when actuated back and forth compresses the spring 50 against the housing 48 and moves the crank arm in 48a to rock the shaft 5. If a parquetry unit becomes clogged in the hopper 1 or on the table 6 so as to form an obstruction in the path traveled by the pusher 3, the spring 50 yields to relieve the pusher 3, thus preventing any damage that might otherwise occur to the machine. The rod is actuated back and forth by a cross-head 51 slidable in ways 52 and propelled by an eccentric 53 on a shaft 54. Shaft 54 is driven by a gear train 55, 56, 57, 58, the last gear of which, 58, is mounted on the main drive shaft 59, which is motor-driven as shown in Fig. 10.

As pusher bar 3 forces the bottom block of the stack out from the hopper, the block passes beneath a plurality of individually spring-pressed holding down fingers 10, arranged in a row just outside the hopper as shown in Figs. 1, 2, 20. Each finger consists of a plate having a rib-like edge 10a that engages one or more of the flooring pieces in the block transversely of the grain of the wood. The plate is pressed by a spring 10b down upon the upper face of a bracket 10c. The bracket 10c carries a rocker bar 10d that is mounted in fixed end bearings 10e. The bracket also has a lug 10f normally held down by a spring-pressed latch 10g. Each finger can yield to conform to irregularities in the surfaces of the flooring pieces as they slide from the hopper to the table and the whole series can, in case of emergency, rise simultaneously against the action of spring-pressed latch 10g. The latch 10g can be swung in a horizontal plane out of engagement with the lug 10f. All of the fingers can then be lifted up simultaneously, bracket 10c turning about shaft 10d.

The disappearing fingers 14 are located at the sides of reciprocating rail 12, as shown in Figs. 4, 7, 8, and are mounted on pivots 60 on outwardly and upwardly extending arms 61, the fingers being spring-connected to the arms so the work-engaging end of each finger will be yieldingly held in its upwardly projected position, determined by a stop 62. At the end of rail 12 from which the work is pushed into the assembly station is a forwardly projecting finger 15, pivoted to the under side of the rail and spring pressed upwardly. The end of the rail is bifurcated to receive the finger 15, as indicated in Figs. 1 and 4.

For driving the rail a connecting block 12a, shown in Figs. 6, 8, 10, is fixed to it and is operatively connected to shaft 54 by a train of link work consisting of pivoted link 63, oscillatable arm 64 which is pivoted at its lower end to a fixed support on the frame of the machine, link 65, oscillating slotted lever 66 and crank arm 67 on shaft 54. Oscillatable arm 64 is preferably fitted with a spring-controlled overload relief mechanism 68, operating in known manner.

To cut the grooves in the blocks groove cutters 9, 9a are fixed to spindle 9b which is rotatable in fixed bearings and is preferably driven by a suitable motor so the cutters are power-driven independently of the other mechanisms, as shown.

The pilot bar 16 and the alinement bar 17 are supported on the machine frame, as shown in Figs. 6 and 6a, by brackets 69 and 70. The bars are fixed to the brackets by bolts or otherwise. The liftable bar 17a is pivoted at 17b to an upstanding flange on bracket 69.

The block-squeezing mechanism, comprising the disappearing stop 19 and the pusher 20 with the devices that actuate them will now be described.

The disappearing stop 19, Figs. 1 and 8, comprises a pair of upright bars spaced apart, their lower ends carried by pivoted arms 71 that are oscillated up and down by a rotatable cam 72 acting on a roller 71a.

The pusher 20 has a forward and backward movement and its upper end projects up through the table far enough to engage the block. It is carried by a link 73, formed with notches 73a, whereby the pusher can be adjusted to suit different sizes of blocks. Link 73 is pivotally supported at one end by an upstanding oscillatable arm 74 pivoted at its lower end to the machine frame and at its other end to the upper end of a similar oscillatable arm 75. The lower end of arm 75 is pivoted at 76 to the frame. The arm 75 carries a bracket 75a on which is a compression spring 75b that bears against the side of a depending arm 77, pivoted at 76 and carrying a roller 77 at its lower end, the roller contacting with a rotatable cam 78. The spring 75b is an overload relief device to limit the maximum amount of pressure that pusher 20 can exert against the block.

Cams 72 and 78 are mounted on shafts 79, 80, and as shown in Fig. 6, are driven by gears 81, 82 in mesh with gear 83 on central shaft 84 that carries a gear 85, driven by pinion 56 and gears 57 and 58, from the main power shaft 59.

The ribbon gripping and feeding fingers 23 are driven by link 25, shown in Figs. 6, 10 and 21, and the link is actuated by an upstanding oscillating arm 86 fixed to a rock shaft 26. The rock shaft is driven by a disk crank 87 on central shaft 84. The connection between crank 87 and arm 86 includes a trip release device whereby the spline making mechanism can be quickly disconnected from the block mechanism. This disconnecting device includes a link 88 pivoted at one end to the crank disk and at the other end to an oscillatable arm 89 that is loose on rock shaft 26.

An arm 90 is fixed to shaft 26 and it is oscillated to the right in Fig. 21 upon being caught by a hook 91 pivoted on arm 89. Arm 90 is oscillated in the other direction by an adjustable stop 92 on arm 89. When hook 91 is raised by a handle 91a the spline and block mechanisms are operatively disconnected from each other.

The spline-shearing device is actuated by the same mechanism and simultaneously with the spline V-forming and flattening devices. All are mounted, as shown in Figs. 6 and 10, on a horizontal framework 93 that is positioned above the table and is movable up and down, being carried by four upright rods 35 slidable vertically in guides 94 on the housing of the machine.

The rods 35 are actuated by four cranks 95 fixed on shafts 78 and 80 and pivoted respectively to the appropriate rods 35.

The framework 93 carries bumpers 30a that actuate the ribbon shearing die 30, as shown in Figs. 6 and 10. Similarly, other bumpers 31b actuate the V-forming dies 31.

The liftable bar 17a is automatically lowered before the block enters the assembly station, and is lifted clear of the block just previous to the ejection of the block. The lifting device for bar 17a is shown in Figs. 6, 6a and 22. A finger 96 projects through an opening in the liftable bar 17a and is pivoted to a fixed bracket 97 on the machine table 6. To lift the bar 17a the rear end of finger 96 is pushed down by an adjustable abutment 98 fixed to the vertically movable framework 93. This causes the bar 17a to lift clear of the block and permits the block to be ejected, while the finger snaps into temporary locking engagement with the latch arm 99 that is pivoted to bracket 97.

To release the latch arm 99 from engagement with the finger 96 while the frame is rising, and to thereby permit bar 17a to drop into the groove of the block, a resetting lug 100 is carried by the frame 93 to engage a cam projection 99b on the upper part of the latch arm 99. The latch arm is thus caused to swing about its pivot, disengaging the finger 96 and allowing the liftable bar to drop into its normal working position above the table.

From the foregoing description it is seen that the principal factors of the invention as embodied in the machine illustrated co-operating to produce the result of making parquetry blocks such as shown in Fig. 18 are, the table having a suitable work forwarding mechanism, the cutter that forms the spline groove, the spline feeder that places the V-shaped spline in the groove of the block with the edges of the spline contiguous to the sides of the groove at its bottom, and the spline flattener that drives the edges of the spline outwardly and embeds them in the wood.

Secondary co-operating devices include the alinement groove cutter and alinement guide for accurately holding the flooring pieces against endwise movement relative to each other during the forwarding, block squeezing and spline flattening operations; the ribbon feeding, shearing and V-forming devices; the block ejector, and the several power driven mechanisms operatively connected and arranged to actuate the said factors and devices in appropriately timed-in relation to each other.

Having thus described my invention, what I claim and desire to secure by Letters Patent is:

1. A parquetry block making mechanism comprising in combination a table, work-piece forwarding mechanism, a groove cutter maintained opposite the table at a fixed distance therefrom, shearing dies arranged to only partly sever a strip of ribbon metal, V-spline forming dies, spline forwarding means arranged so as to advance the spline in alinement with a groove made in the block by said cutter whereby the edges of the V-spline are positioned against the sides of the groove at its bottom, a spline flattening and final severing mechanism and power driven mechanism connecting a source of power respectively to said work-piece forwarder, dies, spline forwarding means and flattener and arranged to actuate the same in timed-in relationship to each other.

2. A parquetry block making mechanism comprising in combination a table, work-piece forwarding mechanism, a groove cutter maintained opposite the table at a fixed distance therefrom, ribbon metal shearing dies, V-spline forming dies, spline forwarding means arranged so as to advance the spline in alinement with and into a groove made in the block by said cutter, spline flattening means and power driven mechanism connecting a source of power respectively to said work-piece forwarder, dies, spline forwarding means and flattener and arranged to actuate the same in timed-in relationship to each other.

3. A parquetry block making mechanism comprising in combination, a table, work-piece forwarding mechanism, a groove cutter maintained opposite the table at a fixed distance therefrom, ribbon metal shearing dies, metal spline forming dies, spline forwarding means arranged and operating so as to advance the spline and insert it in a groove made in the block by said cutter, flattening means for spreading the spline in the groove, and power driven mechanism connecting a source of power respectively to said work-piece forwarder, dies, spline forwarding means and flattener and operable to actuate the same in timed-in relationship to each other.

4. In a power driven synchronized mechanism for making parquetry blocks, a table having a block forwarder operative thereon with step-by-step advancing movement, a spline groove cutter, a block squeezer, a ribbon-strip feeder, a ribbon strip shearing die adapted to only partly sever the ribbon strip, a V-forming die and a spline flattening, spreading, and final severing mechanism.

5. In a parquetry block making mechanism the combination of a table, a work forwarder, a spline groove cutter and an alinement groove cutter both positioned opposite the table, a spline-groove pilot bar and an alinement-groove guide bar parallel therewith and alined respectively with said grooves, V-spline forming mechanism, a feeder arranged to forward a V-spline in alinement with and into the spline-groove of the block, a spline flattener, means operative to remove the alinement guide bar from the alinement groove in the block, a block ejector and power driven mechanism operative to actuate the above mentioned work-engaging devices in appropriately timed-in relationship to each other.

6. In a parquetry block making mechanism the combination of a table, a work forwarder, a spline groove cutter and an alinement groove cutter both positioned opposite the table, a spline-groove pilot bar and an alinement groove guide bar parallel therewith and alined respectively with said grooves, block squeezing mechanism, V-spline forming mechanism, a feeder arranged to forward a V-spline in alinement with and into the spline-groove of the block, a spline flattener operable while the block is engaged by the squeezing mechanism, means operative to remove the alinement guide bar from the alinement groove in the block, squeezer releasing mechanism, a block ejector and power driven mechanism operative to actuate the above mentioned work-engaging devices in appropriately timed-in relationship to each other.

7. In a parquetry block machine, the combination of mechanism for intermittently feeding a plurality of flooring pieces, assembled in block form with their longitudinal edges transverse of the direction of feed, mechanism for cutting a groove in a face of said block crosswise said flooring pieces, mechanism for intermittently feeding a metal spline, formed with a longitudinal ridge, into said groove and positioning it therein with the edges of the spline adjacent the corners of the groove, and mechanism for flattening and spreading said spline in a manner to force its edges into locking engagement with the side walls of said groove.

8. In a parquetry block machine, the combination of mechanism for intermittently feeding a plurality of flooring pieces assembled in block form with their longitudinal edges transverse of the direction of feed, mechanism for cutting a groove in a face of said block crosswise said flooring pieces, mechanism for intermittently feeding a laterally expansible spline into said groove and positioning it therein, and mechanism for expanding said spline in a manner to bring its edges into locking engagement with the walls of said groove.

In testimony whereof, I affix my signature.

GLENN G. RHINEVAULT.